United States Patent [19]
Halstead et al.

[11] Patent Number: 5,251,374
[45] Date of Patent: Oct. 12, 1993

[54] METHOD FOR FORMING HEAT EXCHANGERS

[75] Inventors: Gary A. Halstead, 109 Parklane Cir., Lockport, N.Y. 14094; Paul J. Conn, 1371 West River Rd., Grand Island, N.Y. 14072

[73] Assignees: Gary A. Halstead, Lockport; Paul J. Conn, Grand Island; S. A. Day Manufacturing Company Inc., Buffalo, all of N.Y.

[21] Appl. No.: 938,945

[22] Filed: Sep. 1, 1992

[51] Int. Cl.⁵ .............................................. B23P 15/26
[52] U.S. Cl. ........................... 29/890.047; 29/890.054; 228/183
[58] Field of Search .................. 29/890.047, 890.054; 228/183, 248, 217, 263.17

[56] References Cited
U.S. PATENT DOCUMENTS

| | | | |
|---|---|---|---|
| 3,951,328 | 4/1976 | Wallace et al. | 228/207 |
| 3,971,501 | 7/1976 | Cooke | 228/248 |
| 4,606,495 | 8/1986 | Stewart, Jr. et al. | 228/183 |
| 4,981,526 | 1/1991 | Kudo et al. | 148/25 |
| 5,005,285 | 4/1991 | Ishii | 29/890.54 |
| 5,100,048 | 3/1992 | Timsit | 228/198 |
| 5,102,033 | 4/1992 | Woods et al. | 228/263.17 |
| 5,150,520 | 9/1992 | De Risi | 228/173.2 |

Primary Examiner—Irene Coda
Attorney, Agent, or Firm—Gary M. Hartman; Domenica N. S. Hartman

[57] ABSTRACT

An improved method for assembling a brazed heat exchanger unit suitable for use in an automobile air conditioning system. Prior to assembly, a sufficiently viscous flux-brazing composition is selectively applied to the internal and external features of the heat exchanger which serve as the joining surfaces of the heat exchanger. The flux-brazing composition is specifically applied to the internal surfaces of the aluminum alloy header and the external surfaces of the tubes so as to form uniformly and consistently brazed internal and external joints. The flux-brazing composition of this invention consists of potassium tetrafluoroaluminate particles, an aluminum-silicon powder, zinc and a binder. The flux-brazing composition enables the selective application of both a flux compound and a brazing compound, eliminating excessive use of flux and eliminating the need to clad the components of the heat exchanger with an aluminum alloy brazing material.

19 Claims, 2 Drawing Sheets

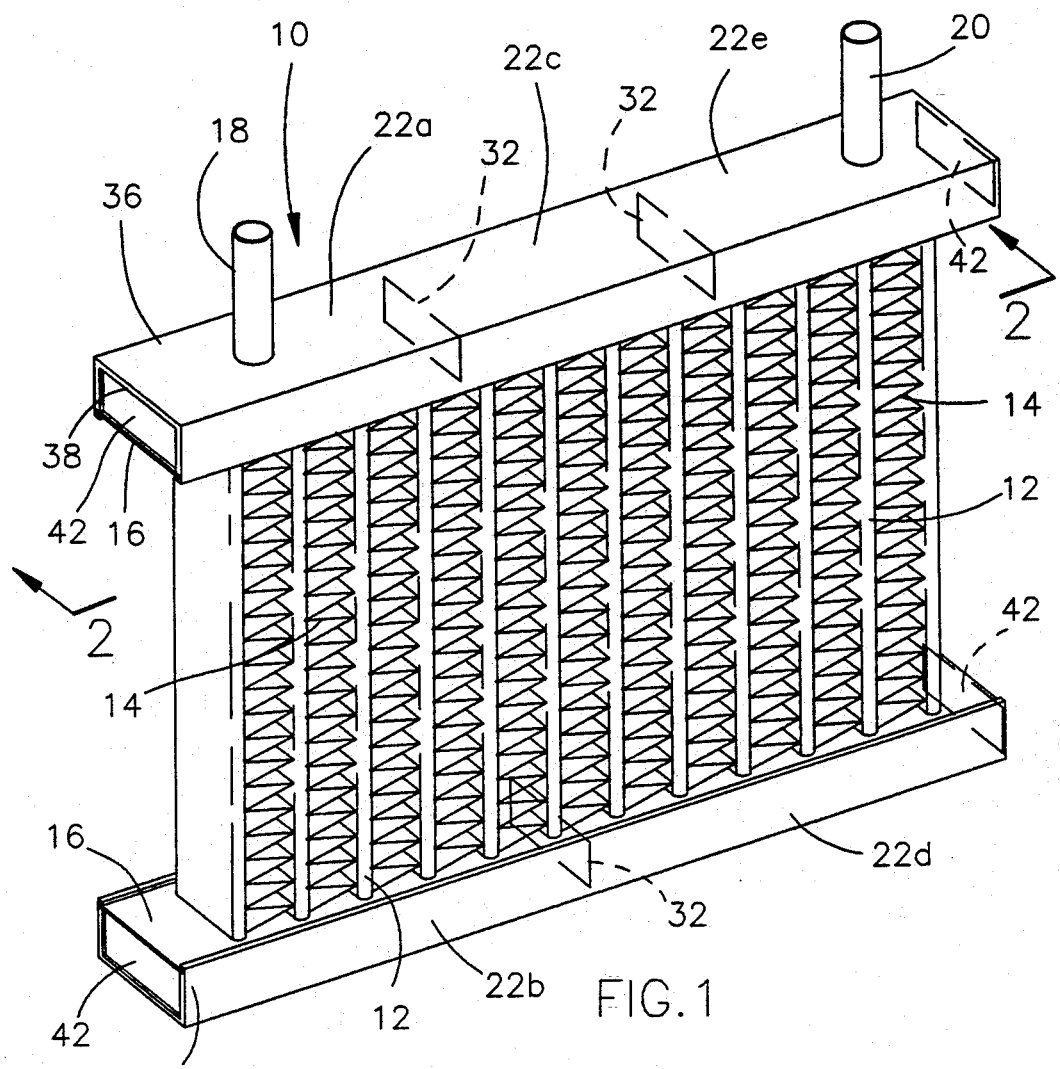
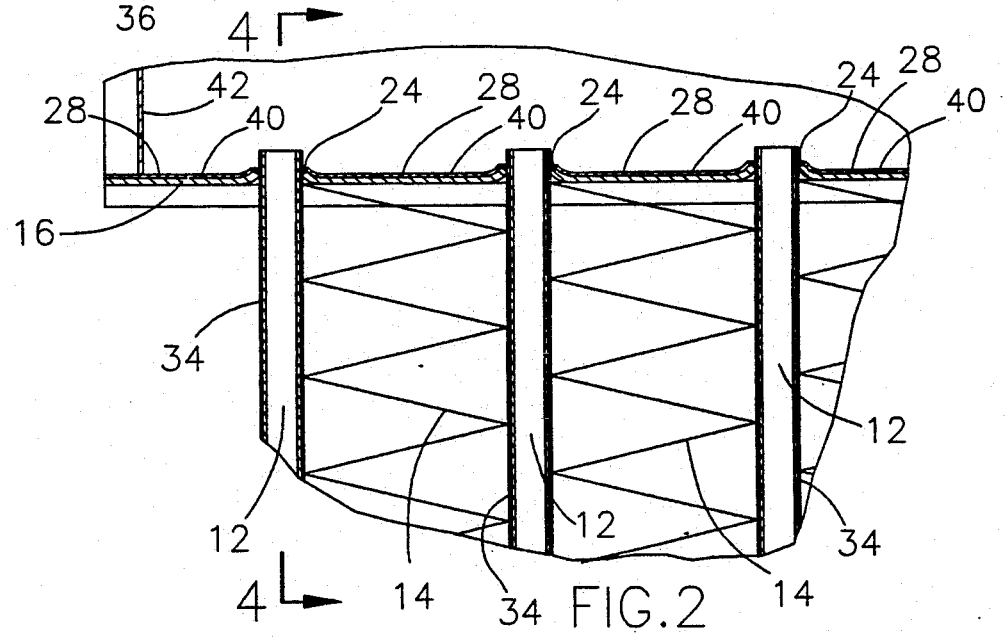

METHOD FOR FORMING HEAT EXCHANGERS

The present invention relates to an improved method for assembling a heat exchanger such as that used as engine radiators and air conditioning condensers. More particularly, this invention relates to improved fluxing and brazing techniques for formation of the internal and external joints of a tube-and-center type heat exchanger, wherein a flux-brazing composition is deposited at the joint sites prior to assembly and brazing of the heat exchanger.

BACKGROUND OF THE INVENTION

Heat exchangers are routinely employed within the automotive industry, such as in the form of radiators for cooling engine coolant, condensers and evaporators for use in air conditioning systems, and heaters. So as to efficiently maximize the amount of surface area available for transferring heat between the fluid within the heat exchanger and the environment, the design of the heat exchanger is typically of a tube-and-fin type containing a multitude of tubes which thermally communicate with high surface area fins. The fins enhance the ability of the heat exchanger to transfer heat from the fluid to the environment, or vice versa. Increasingly, heat exchangers used in the automotive industry are being formed from aluminum alloys so as to help reduce the weight of automobiles.

Conventionally, heat exchangers are constructed using one of several methods. One such method utilizes mechanical expansion techniques and has been traditionally used for mass-producing radiators. Mechanical expansion techniques rely solely on the mechanical joining of the components of the heat exchanger, such as the joining of the tubes to the fins to ensure the integrity of the heat exchanger. Advantages to this method of assembly include good mechanical strength and avoidance of joining operations which require a furnace operation, while disadvantages include inferior thermal performance and relatively high weight.

To overcome the disadvantages of the mechanical expansion-type heat exchangers, heat exchangers are increasingly being formed by a brazing operation, wherein the individual components of the heat exchanger are permanently joined together with a brazing alloy. Generally, brazed heat exchangers are lower in weight and are better able to radiate heat as compared to mechanical expansion-type heat exchangers. An example of such a heat exchanger is referred to as the serpentine tube-and-center (STC) type, which involves one or more serpentine-shaped tubes which traverse the heat exchanger in a circuitous manner. The serpentine-shaped tubes are brazed to a number of high surface area finned centers with an inlet and outlet being located at opposite ends of the tube or tubes.

Another type of heat exchanger involves a number of parallel tubes which are brazed to and between a pair of headers, wherein finned centers are brazed between each adjacent pair of tubes. This type of heat exchanger is referred to as the headered tube-and-center (HTC) type. Conventionally, headered tube-and-center type heat exchangers have been constructed by inserting the parallel tubes into apertures formed in each of an opposing pair of headers. A finned center is then positioned between each adjacent pair of parallel tubes. Vessel-like members are placed at each header to form tanks therewith which are in fluidic communication with the tubes through the apertures. The tanks include ports which serve as an inlet and outlet to the heat exchanger. The above individual components are fixtured together before undergoing a furnace brazing operation that permanently joins the components to form the heat exchanger assembly.

One brazing technique which has become accepted by the automotive industry involves an inert atmosphere furnace operation. To destroy and remove the aluminum oxide layer on the aluminum alloy headers, tubes, finned centers and tanks, the assembly or its individual components are generally sprayed with or dipped into a flux mixture to enhance the brazeability of the brazing alloy prior to brazing. A conventional flux mixture consists of about 15 to about 25 volume percent flux solids suspended in water. The assembly is then dried to evaporate the water, leaving only the powdery flux solids on all of the external surface of the assembly.

A satisfactory type of flux for use with these aluminum alloys has been potassium fluoaluminate complexes, as disclosed in U.S. Pat. Nos. 3,951,328 and 3,971,501 to Wallace et al and Cooke, respectively. However because the flux is only introduced externally to the assembly (through dipping or spraying), the internal joints of the assembly, particularly the tube-to-header joints, do not directly benefit from the application of the flux, as evidenced by the high percentage of defective leaky assemblies, which at times may be as high as about ten to thirty percent. In addition, defective assemblies must individually undergo a costly repair, which increases the effective cost of producing the heat exchangers.

From the above, it is apparent that the brazing operation for a headered tube-and-center heat exchanger is complicated by the numerous brazements required for each tube, each of which must be brazed to both headers and its corresponding finned centers during a single brazing operation. Generally, the brazements are achieved by employing an aluminum alloy brazing stock material to form the headers and the finned centers. The aluminum alloy brazing stock material consists, for example, of an appropriate aluminum alloy core which has been clad on at least one side with an aluminum-based brazing alloy. Generally, the brazing alloy has been provided on both surfaces of the finned centers and on only the external side of the header, i.e., the side through which the tubes are inserted.

Typically, the cladding layers are an aluminum-silicon eutectic brazing alloy, such as AA 4045, AA 4047 and AA 4343 aluminum alloys (AA being the designation given by the Aluminum Association), which is characterized by a melting point which is lower than the core aluminum alloy, which is often AA 3003. Therefore, the brazing operation involves raising the temperature of the assembly such that only the clad layers of brazing alloy melt during the brazing operation. The brazing alloy then flows toward the desired joint regions and, upon cooling, solidify to form the brazements.

Conventionally, it is known to provide the brazing alloy as 1) a foil which is brazed to the extruded tubes of a serpentine tube-and-center type heat exchanger, 2) a molten coating which is deposited on the extruded tubes, or 3) a liner on an ingot which is hot milled to produce a silicon-clad aluminum alloy foil used to form the finned centers and headers of a headered tube-and-center type heat exchanger or finned centers of a serpentine tube-and-center type heat exchanger.

A shortcoming of the first two above-described processes, the brazed foil and molten coating processes, is that there are two fluxing operations required: the first to adhere the brazing alloy to the tube's aluminum alloy core, and a second to braze the tubes to the finned centers during the braze furnace operation. The need for two fluxing operations is disadvantageous in that the additional flux, its application, removal and the necessary effluent control procedures required to treat the waste water generated by flux removal, all add costs to the final assembly. In addition, the conventional spray and dipping methods required result in the deposition of flux on surfaces of the heat exchanger components which do not serve as braze joint areas and thus do not require flux. The additional flux also aggravates the tendency for the flux to corrode the interior of the furnace, resulting in additional maintenance and repair of the furnace.

Another disadvantage with the brazed foil and molten coating processes is that the silicon within the brazing alloy tends to diffuse into the aluminum alloy core at the elevated temperatures required for the brazing operation. As a result, the corrosion resistance of the brazing alloy is reduced and, due to the reduced silicon content in the brazing alloy, the furnace temperatures required to melt the brazing alloy are higher.

In addition, a shortcoming of the above-described hot milled method is that silicon clad aluminum alloy center stock material which is less than about 0.004 inch thick is difficult to obtain commercially, therefore generally resulting in undesirable additional weight to the heat exchanger. Another shortcoming is that relatively few aluminum suppliers can provide clad aluminum, and then generally only in excessively large volumes, such as a minimum ingot weight of about 7000 pounds. This is particularly disadvantageous to low-volume manufacturers. Further, the silicon clad aluminum alloy centers are more difficult to machine, thereby significantly reducing tool life.

Lastly, the general practice of cladding the aluminum alloy core with an aluminum-silicon brazing alloy also tends to be disadvantageous in that the silicon content of the clad brazing alloy may vary significantly. For example, in the more commonly used brazing alloys, the silicon content can vary between about 9 and 11 weight percent for the AA 4045 alloy, between about 11 and 13 weight percent for the AA 4047 alloy, and between about 6.8 and 8.2 weight percent for the AA 4343 alloy (AA being the designation given by the Aluminum Association). For every one weight percent variation in silicon within the brazing alloy, the melt temperature of the brazing alloy can vary by about 10° F. This variability in silicon content significantly complicates the process control for the subsequent furnace braze operation.

From the above, it is apparent that it would be desirable to provide a method for furnace brazing a heat exchanger that does not involve an aluminum alloy core which is conventionally clad with a brazing alloy. In addition, it would be desirable to limit the quantity of flux applied to those internal and external regions of the heat exchanger which serve as joining sites, particularly the tube-to-header joints and the tube-to-fin joints of a headered tube-and-center type heat exchanger.

It would also be desirable to use a minimal quantity of flux, wherein the flux has a sufficiently high viscosity to enable the flux to be selectively applied while remaining on the surface to which it is applied. However, the conventional flux mixture used in the spray and dipping techniques has a sufficiently low viscosity such that the flux mixture is incapable of being consistently deposited at a predetermined region. Also, after evaporation of the aqueous solvent, the flux has a particulate shape which does not adhere well to the surfaces of the heat exchanger. Subsequent handling and assembly of the heat exchanger causes sufficient agitation to shake loose a portion of the flux particulates from the heat exchanger surface.

Another shortcoming associated with the use of the conventional flux mixture is that during brazing, it is extremely important that the furnace atmosphere have a dewpoint of about 45° F. or below and a free oxygen level of 100 parts per million (ppm) or less. A common approach has been to employ high purity cryogenic nitrogen. In a high dewpoint or high oxygen-containing atmosphere, a greater amount of oxidation of the aluminum occurs during the brazing cycle, thereby requiring greater quantities of flux. Therefore, with the conventional approach wherein the flux solids are suspended in an aqueous solution, all of the water must be removed prior to the brazing operation. This is difficult to consistently achieve in a production environment. In addition, entrapped moisture and oxygen inside the tanks and tubes of the condenser assembly also impede brazing, thereby requiring complete purging of the assembly just before the brazing operation, which is again costly and difficult to achieve.

Therefore it would be advantageous to provide a method for brazing serpentine tube-and-center type and particularly headered tube-and-center type heat exchangers, wherein both the brazing alloy and a minimum quantity of flux can be preapplied together to specific regions of the heat exchanger during assembly so as to enhance the brazing of the internal and external joints, specifically between the tubes and headers and between the tubes and finned centers, respectively. By improving the uniformity and consistency of the internal brazed joints, the number of defective leaky assemblies should be significantly reduced. In addition, it would also be advantageous if the flux were not suspended in an aqueous solution, so as to minimize the amount of moisture surrounding the assembly during the brazing operation, thereby optimizing the integrity of the brazing procedure.

SUMMARY OF THE INVENTION

It is an object of this invention to provide a method for assembling a brazed heat exchanger unit, such as a condenser for use in an automotive air conditioning system.

It is a further object of this invention that such a method for assembly employ a novel flux-brazing composition that eliminates the need for assembling the heat exchanger with components which are clad with a brazing alloy.

It is another object of this invention to provide a novel flux-brazing composition which can be applied accurately to specific surfaces of the heat exchanger prior to assembly, so as to facilitate the brazing of internal and external joints of the heat exchanger, and thereby promote complete and consistent brazing between the tubes and headers and between the tubes and finned centers of a headered tube-and-center type heat exchanger.

It is still a further object of this invention that such a method for assembly of the heat exchanger unit produce high integrity internal joints between the tubes and headers so as to minimize the number of defective assemblies due to leaky internal joints.

In accordance with a preferred embodiment of this invention, these and other objects and advantages are accomplished as follows.

According to the present invention, there is provided an improved method for assembling a brazed heat exchanger unit which is suitable for use in automotive applications, such as the condenser for an air conditioning system, wherein the assembly method utilizes a novel flux-brazing composition that is applied to both the internal and external features of the heat exchanger prior to assembly. The flux-brazing composition is specifically applied to the joint surfaces of clad-free subcomponents of the heat exchanger so as to promote the complete and consistent brazing of the internal and external joints and components.

The flux-brazing composition of this invention consists of a conventional flux, such as potassium tetrafluoroaluminate particles, an aluminum-silicon powder, a metal whose electrode potential is less than that of the aluminum alloy from which the tubes and headers are formed, and a binder. Alternatively, the above flux-brazing composition can be suspended in a glycerin-ethylene glycol carrier system to form a slurry.

The method of this invention for assembly of a headered tube-and-center type heat exchanger generally includes the following steps. It is to be noted that the method of this invention is equally applicable to the formation of serpentine tube-and-center type heat exchangers. The assembly of a headered tube-and-center type heat exchanger is described below for illustrative purposes only.

First, a pair of headers are stamped from an aluminum alloy material, after which the headers are cleaned and coated with the flux-brazing composition of the present invention. Each of the headers is formed to have a elongate shape with a number of apertures therethrough which are sized to closely receive an identical number of tubes. In addition, the headers are preferably adapted to each receive a tank member which will be brazed or otherwise attached to the header to form a tank therewith.

Prior to further assembly of the heat exchanger, a predetermined amount of the flux-brazing composition of this invention is deposited onto a peripheral surface of each header and between each of its apertures. The predetermined amount of the flux-brazing composition is sufficient to deoxidize and wet substantially the entire surface of the header between each of the apertures and the periphery of the header such that the flux-brazing composition will flow and create fillets between the header and the tubes and between the header and the tank member, respectively, during the subsequent brazing operation.

The tubes are preferably formed from aluminum alloy extrusions which are also coated with a predetermined quantity of the flux-brazing composition prior to assembly. The flux-brazing composition is applied to the external surfaces of the tubes to promote the formation of braze fillets between the finned centers and the tubes, as well as between the tubes and the headers, during the subsequent brazing operation.

The tubes are then assembled into the headers with a finned center being positioned between each adjacent pair of tubes. Each tube is inserted into a corresponding aperture in each header so that the tubes all extend in hydraulic parallel between the headers. The tank members are then positioned on the headers. The tubes, headers, tank members and finned centers are then brazed together in a controlled atmosphere furnace using a conventional brazing cycle employed with an aluminum-silicon brazing alloy.

In another embodiment in which the flux-brazing composition is in the form of a slurry, the tubes, headers, tank members and finned centers can be preassembled with fixturing, after which the entire assembly can be sprayed with the slurry. Thereafter, the slurry is dried and the entire assembly undergoes the furnace brazing operation described above.

The method for assembly of this invention is particularly advantageous in that the amount of flux used for the brazing operation is significantly reduced because of efficient use and placement of the flux-brazing composition. As a result, furnace maintenance is reduced and furnace life is increased. In addition, the need to dry the flux prior to the brazing operation is eliminated in that no water is present, thereby avoiding the need to provide a drying oven and its associated costs.

Another advantage to the present invention is that the components of the heat exchanger do not require a braze alloy cladding. In particular, the finned centers are not clad with a brazing alloy, and therefore can be formed from thinner stock than is conventionally possible. Unclad components are also more readily machined, thereby improving the tool life. Finally, the elimination of clad aluminum alloys is particularly advantageous for low-volume manufacturers in that such manufacturers are not forced to make large quantity purchases, which would otherwise tend to be commercially necessary.

Also, since the flux-brazing composition of this invention is not suspended in water, the flux-brazing composition does not contribute to additional moisture around the assembly during brazing, which could detrimentally cause oxide buildup on the brazed surfaces and thereby hinder the formation of high quality brazed joints. Further, since the internal features of the assembly, particularly the internal surfaces of the headers, have both a flux and brazing composition deposited thereon, uniformly brazed internal joints are formed between the tubes and headers, thereby significantly reducing the number of defective heat exchanger assemblies due to leaky internal joints.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawing wherein:

FIG. 1 illustrates a perspective view of a headered tube-and-center type heat exchanger unit which was formed in accordance with the assembly method of this invention;

FIG. 2 is a partial cross-sectional view along line 2—2 of FIG. 1 showing the assembly of the tubes and finned centers with the headers in detail, as well as the preferred flux-brazing composition placement on the header and tubes;

DETAILED DESCRIPTION OF THE INVENTION

Figure 3:
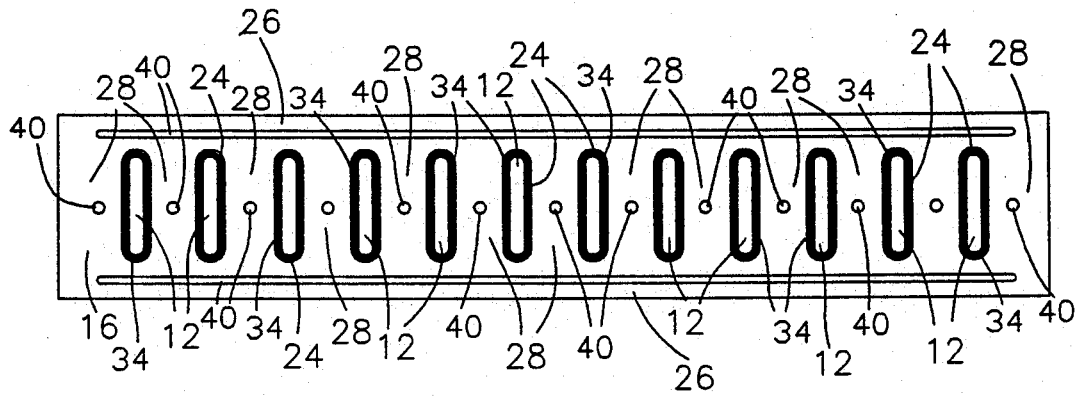
FIG. 3 is a top view of the header of FIG. 2 showing the preferred flux-brazing composition placement on the interior surface of the header.

An improved method is provided for assembling and brazing a heat exchanger which is suitable for automotive applications. Such a heat exchanger is particularly adapted for use as the condenser of an automobile air conditioning system. The method of the present invention utilizes a novel flux-brazing composition that is particularly suitable for applying to the header and tube surfaces of a headered tube-and-center type heat exchanger so as to promote the complete and consistent brazing of the internal and external joints this type of heat exchanger.

Shown in FIG. 1 is a perspective view of a conventional headered tube-and-center type heat exchanger unit 10 which was formed in accordance with the improved assembly method of this invention. The tube-and-center design is preferred for these types of heat exchangers 10, i.e., air conditioning condensers, because the design maximizes the amount of surface area that is in contact with incoming air. The air is forced around the high surface area provided by finned centers 14 located between adjacent pairs of heat exchanger tubes 12, providing for a high heat exchange rate between the air and a suitable fluid which flows through the tubes 12. The tubes 12 are oriented to be geometrically in parallel with each other as well as hydraulically in parallel.

Also shown are an inlet 18 and outlet 20 provided in fluidic communication with a pair of reservoir tanks which are formed by a pair of tank members 36 in combination with a pair of headers 16. The reservoir tanks are partitioned into reservoir tanks 22a through 22e by a number of separators 32 and two pairs of end plates 42. The tubes 12, the inlet 18, the outlet 20, and the tanks 22a-e form a continuous and circuitous fluidic path through the heat exchanger 10 for the fluid.

While the above type of heat exchanger is particularly suited for the teachings of the present invention, it will be apparent to those skilled in the art that other types of heat exchangers, such as serpentine tube-and-center type heat exchangers, will also benefit from these teachings.

Shown in greater detail in FIG. 2 is an illustrative region in cross-section of one of the headers 16 with a number of tubes 12 inserted within corresponding apertures 24 formed in the header 16. Also shown are a number of finned centers 14 provided between each adjacent pair of tubes 12. Each header 16 is stamped and pierced from an aluminum alloy material to have an elongate shape with a number of evenly spaced apertures 24, as shown most clearly in the top view of FIG. 3. A preferred alloy is aluminum alloy AA 3003, as designated by the Aluminum Association (AA), though other similar aluminum alloys could be employed. The tubes 12 are also preferably an aluminum alloy, such as AA 3003, and are typically formed as extrusions which exceed the necessary tube length for assembling to the headers 16. For example, the tubes 12 may be originally provided in lengths of about 10 feet, from which a number of tubes 12 can be cut, preferably after applying the flux-brazing composition of this invention, although this is not necessary.

Generally speaking, aluminum alloy AA 3003 has been found to perform satisfactorily and can be easily stamped to form the headers 16 and extruded to form the tubes 12, as well as being suitable to form the finned centers 14 and the tank member 36. In addition, there are no inherent brazing difficulties associated with the use of this particular alloy, and the structural integrity of the material during use has generally been found to be sufficient. In accordance with the teachings of this invention, and contrary to the prior art, the aluminum alloy from which the headers 16, tubes 12 and finned centers 14 are formed is not clad with an aluminum-silicon brazing alloy.

Figure 4:
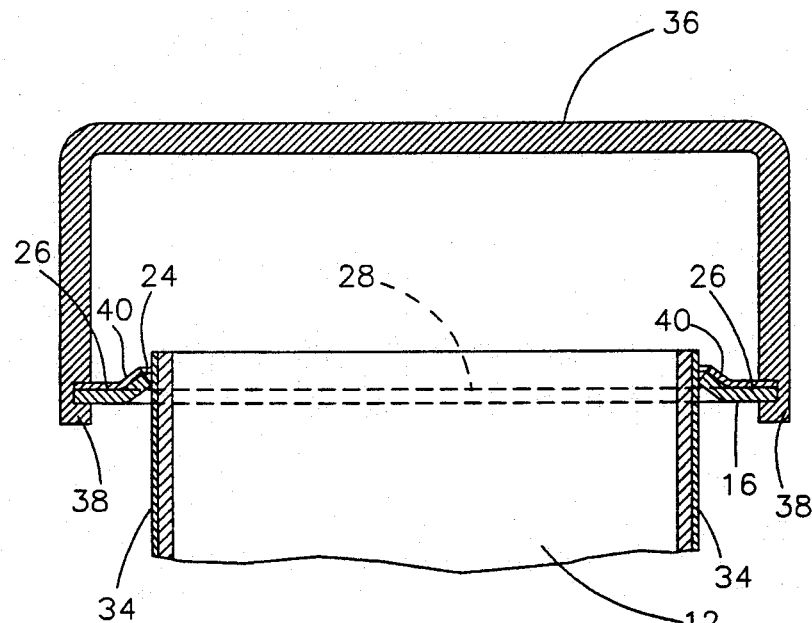
FIG. 4 is a cross-sectional view along line 4'4 of FIG. 2 showing the assembly of the header, tubes and a tank member and illustrating the preferred placement of the flux-brazing composition.

As seen in FIG. 3 (depicting the placement of the preferred flux-brazing composition 40 prior to a brazing operation) and in FIGS. 2 and 4 (depicting the location of the preferred flux-brazing composition 40 after a brazing operation), an inventive feature of this invention is that a predetermined amount of the preferred flux-brazing composition 40 is deposited onto the external surface 34 of each tube 12 and on each header 16 along both longitudinal edges 26 and between each of the evenly spaced apertures 24 (represented by region 28 shown in FIGS. 2 and 3) prior to assembly of the heat exchanger 10. The flux-brazing composition 40 is applied to the external surfaces 34 of the tubes 12 to promote the external formation of braze fillets between the finned centers 14 and the tube 12 as well as between the tubes 12 and the headers 16 during the subsequent brazing operation. The flux-brazing composition 40 is applied to the internal surfaces 26 and 28 of the headers 16 to promote the internal formation of braze fillets between the headers 16 and the tubes 12 as well as between the headers 16 and the tank members 36 during the subsequent brazing operation.

The preferred flux-brazing composition 40 is a mixture of a suitable flux compound, an aluminum-silicon braze alloy powder and zinc held together with a suitable binder. More specifically, the preferred flux compound is potassium tetrafluoroaluminate ($KAlF_4$) which is present within the flux-brazing composition 40 within the range of from about 10 to about 50 weight percent. The flux-brazing composition 40 of this invention also includes from about 2 to about 13 weight percent silicon particles, from about 0.5 to about 3 weight percent zinc particles, and from about 0.1 to about 2 weight percent of an organic binder, with the balance being aluminum particles. More preferably, the flux-brazing composition 40 of this invention contains about 20 weight percent potassium tetrafluoroaluminate, about 6 weight percent silicon particles, about 1.0 weight percent zinc particles, and about 0.2 weight percent organic binder, with the balance being aluminum particles. In addition, the particle size of the silicon, zinc and aluminum particles should preferably be no greater than about 100 microns to promote the ability of the flux-brazing composition 40 to be applied as a smooth coating.

Potassium tetrafluoroaluminate is preferred as the flux compound because it has proven to be reliable with aluminum alloys of the type employed in the heat exchanger 10 and, after brazing and upon solidification, it forms a non-corrosive, glassy, ceramic residue which does not impair the operation of the heat exchanger 10. Most preferably, the particle size of the potassium tetrafluoroaluminate should be no greater than about 50 microns to promote smooth application of the flux-brazing composition 40 and the purity of the flux compound should be a minimum of 96 percent potassium tetrafluoroaluminate. The preferred amount of potassium tetrafluoroaluminate present in the flux-brazing composition 40 for a given application is dependent on the quality of the brazing atmosphere. Very low oxygen levels of less than about 10 ppm allows the use of an amount of the flux toward the lower end of the stated range, while oxygen levels on the order of about 100 ppm dictate the use of an amount of the flux toward the upper end of the range.

The preferred quantity of silicon present in the flux-brazing composition 40 is dependent on the proportions of the other constituents present within the flux-brazing composition 40, and also the desired melting point for the flux-brazing composition 40. Specifically, the silicon serves to lower the melting point of the flux-brazing composition 40 below that of the aluminum alloy from which the headers 16, tubes 12, tank members 36 and finned centers 14 are made, such that the brazing operation can be performed without an adverse effect on the aluminum alloy.

The preferred quantity of zinc present in the flux-brazing composition 40 is also dependent on the proportions of the other constituents present within the flux-brazing composition 40. The preferred quantity of zinc present is also dependent on the desired level of corrosion protection required. For example, thin-walled tubes 12 generally require greater corrosion protection, and thus greater quantities of zinc, while large, thick headers 16 may require no zinc as an additive to the flux-brazing composition 40. The zinc serves to lower the electrode potential of the flux-brazing composition 40 as compared to the aluminum alloy of the headers 16, tubes 12, tank members 36 and finned centers 14 As a result, these aluminum alloy components will serve as a sacrificial anode to the flux-brazing composition 40, thereby maintaining the integrity of the brazed joints relative to the integrity of the components themselves. As such, the use of a metal having a lower electrode potential than aluminum will serve this purpose, such that, for example, copper, indium and tin can be substituted for zinc in the flux-brazing composition 40.

The organic binder serves to hold the flux-brazing composition 40 in a cohesive state while it is being applied to the heat exchanger components and thereafter until the brazing operation is underway. The preferred quantity used will depend upon the quantity of the other constituents present. Specifically, the organic binder must make the flux-brazing composition 40 sufficiently viscous so as to provide the desired cohesive action, while also being sufficiently fluid so as to permit easy and consistent application of the flux-brazing composition 40 where it is desired on the components of the heat exchanger 10. Yet, the binder must also be sufficiently volatile at elevated temperatures so as to burn-off completely during the brazing operation. A suitable organic binder which has these capabilities is hydroxypropyl cellulose, although other known binders of this type could also foreseeably be used.

Due to the organic binder, the flux-brazing composition 40 has essentially a paste consistency which is characterized by a sufficiently high viscosity such that it is unlikely that the flux-brazing composition 40 will be displaced during subsequent assembly and processing of the heat exchanger 10. Specifically, the preferred viscosity of the flux-brazing composition 40, when tested using standard Zahn viscosity measurements, ranges from about 19 seconds to about 21 seconds with a standard number 4 Zahn cup measurement. This preferred range of viscosities ensures uniform deposition and adherence during subsequent assembly.

In an alternate embodiment, the preferred flux-brazing composition 40 described above may be suspended in a liquid carrier, such as a glycerin-ethylene glycol carrier system, to permit the flux-brazing composition 40 to be applied as a slurry. The slurry can then be sprayed on the assembled heat exchanger 10 prior to the furnace brazing operation. Such a carrier system can consist of from about 12 to about 20 volume percent glycerine, from about 72 to about 80 volume percent ethylene glycol, and up to about ten volume percent water. A nominal composition for the most preferred composition, by volume, would be about 13% glycerine, about 79% ethylene glycol and about seven percent water.

The three compounds, when used in combination, provide the desired viscosity level for applying the flux-brazing slurry using conventional spraying, dipping, rolling and flow coating methods. While it is desirable that the flux-brazing slurry be sufficiently viscous so as to ensure that it remains positioned at the desired regions during assembly, it is also preferable for high volume production applications that the flux-brazing slurry be capable of being deposited through an automatic dispensing orifice without plugging of the orifice. The glycerin-ethylene glycol carrier achieves these results and also will burn-off cleanly during the brazing operation, therefore not hindering the flux or brazing action of the flux-brazing slurry.

In the preferred embodiment, an important feature of this invention is that the flux-brazing composition 40 does not contain water. However, where a spraying, dipping, rolling or flow coating operation is preferred, the preferred liquid carrier described above is designed to employ a minimum of water, while still providing a suitable carrier. As stated previously, a particular problem which occurs during brazing of heat exchangers 10 when using conventional aqueous-based flux compositions, is that it is extremely difficult to remove all of the moisture from within and around the heat exchanger 10 before brazing. The presence of the moisture impedes the brazing action. Accordingly, with the slurry method, the coated heat exchanger 10 should be dried in an oven at a temperature preferably below about 900° F. prior to the brazing operation. However, in practice, it is not uncommon for the heat exchanger 10 to contain entrapped moisture and free oxygen above a dewpoint of about −40° F. and a free oxygen level of greater than about 100 ppm, even though the exterior of the heat exchanger 10 is exposed to a controlled atmosphere below these parameters. Accordingly, the quality of the interior joints associated with use of the slurry may be less than that when using the flux-brazing composition 40 in its preferred paste-like water-free form.

With the preferred flux-brazing composition 40 of this invention, the highly concentrated flux and brazing components are deposited in proximity to the internal and external joints of the heat exchanger 10. As noted above, the internal joints include the tube-to-header interface and the tank member-to-header interface, respectively, while the external joints include the joining surfaces defined by the tube-to-fin centers and, to a lesser degree, the external areas of the tube-to-header interface. The flux-brazing composition 40 is deposited in an amount sufficient to deoxidize the aluminum so as to promote braze fillet formation. It should be noted that, even though some oxidation of the flux-brazing composition 40 will likely occur since the composition 40 is deposited onto the desired regions during assembly and probably not immediately prior to the actual brazing operation, the amount of the flux-brazing composition 40 is sufficient to perform satisfactorily during the brazing operation.

In practice, with the clad-free header 16 described above, about 0.2 to about 0.6 grams per inch of the flux-brazing composition 40 is deposited along each longitudinal edge 26 of the header 16 and about 0.3 to about 0.6 grams are deposited between each of the evenly spaced apertures 24 (represented by region 28), as shown in FIGS. 2, 3 and 4. These amounts may vary considerably depending on the size of the heat exchanger unit 10 and its individual components. The amount of the flux-brazing composition 40 deposited onto the surface (26 and 28) of the header 16 must be sufficient so as to deoxidize and wet substantially all of the surface of the header 16 at each aperture 24 for formation of the internal brazed joints with the tubes 12. In practice, the preferred amount has been determined to be about 0.5 grams per inch for the tank-to-header interface (region 26) and about 0.5 grams between each adjacent pair of tubes 12 (region 28).

As shown in FIG. 2, the flux-brazing composition 40 is deposited onto the internal surface of the header 16, which is the surface oppositely disposed from the tubes 12 extending in hydraulic parallel. Presumably, the flux-brazing composition 40 could be deposited onto this opposite surface as well, however it is not necessary in that it is preferable to coat the tubes 12 with the flux-brazing composition 40 to braze the tubes 12 and finned centers 14 together. In addition, predetermined amounts of the flux-brazing composition 40 should be provided adjacent to those regions where the header 16 will be brazed to the separators 32, for formation of the reservoir tanks 22a-e.

By predepositing the flux-brazing composition 40 at the internal and external joints of both the headers 16 and tubes 12, the flux-brazing composition 40 is in a most efficient location to form high quality brazed joints. During the brazing cycle, the flux component of the flux-brazing composition 40 removes the oxide ordinarily present on the exposed aluminum surfaces, particularly at the internal and external joints. The flux component also promotes flow of the molten brazing component of the flux-brazing composition 40 during the heating step and inhibits further oxide formation.

To perform properly, the flux component must be capable of dissolving and removing the aluminum oxides at the brazing temperatures while remaining essentially inert with respect to aluminum at such temperatures. Since fluxes are reactive to remove the oxide only when at least practically molten, the flux component of the flux-brazing composition 40 must be partly or wholly molten at the brazing temperatures. The preferred potassium tetrafluoroaluminate flux compound meets these requirements.

After depositing the flux-brazing composition 40 on the tubes 12 and headers 16, the tubes 12 may be dried in an oven at a temperature preferably below about 900° F. if it is necessary to cut the tubes 12 to their finished length and size the tubes 12 to their final dimensions with a press or die operation. The tubes 12 are then assembled to the headers 16, after which a finned center 14 is positioned between each adjacent pair of tubes 12. Each tube 12 is inserted into a corresponding aperture 24 in each header 16, so that the tubes 12 extend in geometric and hydraulic parallel between the headers 16, shown most clearly in FIG. 1.

Although at this point, the individual tubes 12 and headers 16 could be brazed together, with assembly of the remaining components, i.e., the tanks members 36 and the inlets 18 and outlets 20, being performed subsequently, it is preferred that all brazing be done concurrently. Therefore, it is preferred that the tanks members 36 and the inlet 18 and outlet 20 are also assembled before brazing, although it is not necessary at this time for purposes of practicing this invention.

Shown cross-sectionally in FIG. 4 is an assembled tank member 36 engaged at each edge 38 to the header 16. The tank member 36 is preferably formed as an extrusion from a compatible aluminum alloy, such as AA 3003. The tank member 36 is permanently secured to the header 16 by brazing, as represented by the preferred placement 26 of the flux-brazing composition 40 of this invention. For formation of the tanks 22a-e, various separators 32 and end plates 42 are required, as most clearly seen in FIG. 1. The separators 32 and end plates 42 are also preferably formed from the aluminum alloy AA 3003. Also, as stated previously with reference to FIG. 2, the flux-brazing composition 40 of this invention is deposited adjacent to the separator 32 and end plate 42 to facilitate high quality brazing. The tanks 22a-e provide reservoirs for the fluid within the heat exchanger 10 during its operation. In the finished heat exchanger assembly 10, each of the tubes 12 are in fluidic communication with at least one of the tanks 22a-e, so that there is a continuous fluidic path from the inlet 18 to the outlet 20 through the tubes 12 and tanks 22a-e.

As noted before, where the flux-brazing composition 40 is desired to be formed as a slurry for spray deposition, the heat exchanger 10 is preassembled and coated with the flux-brazing composition 40 on its external surfaces, so as to facilitate the brazing of any external joints during the subsequent brazing operation. This external application of the flux-brazing composition 40 can be performed in accordance with conventional teachings. As also noted previously, the heat exchanger 10 is preferably dried in an oven at a temperature of no more than about 900° F. before brazing so as to evaporate any water from the heat exchanger 10 surfaces.

With either the flux-brazing composition 40 or slurry, the preassembled heat exchanger 10, consisting of at least the headers 16, tubes 12 and finned centers 14, is brazed in a controlled atmosphere brazing furnace, preferably with a high purity nitrogen atmosphere, using a brazing cycle which is conventional for an aluminum-silicon brazing alloy. During the brazing operation the dewpoint of the nitrogen atmosphere is preferably maintained below about $-40°$ F. and the free oxygen level is preferably maintained below about 100 ppm. The heat exchanger 10 is heated to a temperature from about 1040° F. to about 1130° F., whereupon the flux-brazing composition 40 liquefies and fills the internal and external joints in the assembly producing a leak free heat exchanger 10. After a few more minutes, such as about three to six minutes, at peak temperature, the heat exchanger 10 is cooled to about 950° F. for a minute or two, to allow for equilibration of the brazed joints, and then cooled very rapidly to room temperature.

When exposed to the brazing temperature, the flux component of the flux-brazing composition 40 will deoxidize the coated surfaces of the headers 16 and tubes 12, and the brazing component of the flux-brazing composition 40 will be drawn by capillary action towards the seams at the desired braze joints. Upon cooling, the brazing component will solidify to form the braze bond required to seal the joints and bond the components together. The result is a leak-free, structurally-sound joint between each of the components. Internal residue associated with use of the flux-brazing composition 40 of this invention is less than about 15 milligrams, and can be preferably maintained between about 0.5 and about 3 milligrams. This low level of residue substantially eliminates any chance of compressor damage as a result of residue remaining within the heat exchanger 10 after the brazing operation.

Brazing preferably occurs in a controlled atmosphere so as to reduce or eliminate the formation of a detrimental oxide layer, and to facilitate the concurrent brazing of the numerous brazed joints within the heat exchanger 10, which may not be possible with other forms of brazing, such as dip brazing or wire brazing techniques. However, although controlled atmosphere furnace brazing is highly preferred as the method for forming these heat exchangers 10 because of these practical concerns, other alternative methods for brazing may be utilized.

From the above, it can be seen that a particularly advantageous feature of this invention is that the viscous flux-brazing composition 40 is not only easily deposited onto the surfaces of the headers 16 and tubes 12 without concern for its removal during the subsequent assembly of the heat exchanger 10, but also, since the preferred flux-brazing composition 40 does not require water for its use, additional moisture is not contributed to the brazing atmosphere. As noted above, the presence of moisture detrimentally causes oxide buildup on the brazed surfaces, thereby hindering the formation of high quality brazed joints. The absence of water also eliminates the need for internal flux flushing or nitrogen purging prior to brazing.

Further, since the internal features of the assembly, particularly the internal surfaces of the headers 16, are coated with the flux-brazing composition 40, uniform internal brazed joints are formed between the tubes 12 and headers 16, thereby significantly reducing the number of defective heat exchanger 10 assemblies due to leaky internal joints 34. The application of the flux-brazing composition 40 to the external surfaces of the tubes 12 promotes the formation of uniform external brazed joints between the tubes 12 and headers 16 and between the tubes 12 and the finned centers 14, thereby providing structural integrity to the heat exchanger 10.

The method for assembly of this invention is also advantageous in that, in the preferred embodiment, the amount of flux used for the brazing operation is significantly reduced because of the selective placement of the flux-brazing composition 40 to the desired regions, thereby lowering furnace maintenance and increasing furnace life. In addition, the need to dry the flux prior to the brazing operation can be eliminated since, in the preferred embodiment, the use of water is avoided, thereby avoiding the need to provide a drying oven with its associated costs.

Another advantage to the use of the flux-brazing composition 40 of this invention is that the components of the heat exchanger 10 do not require a braze alloy cladding. For example, because the finned centers 14 are not clad with a brazing alloy, they can be formed from thinner stock than is conventionally possible. Finned center stock which is clad with a brazing alloy is conventionally available at thicknesses of at minimum about 0.0045 inch, whereas finned center stock can be reduced to as little as 0.0025 inch thick in accordance with the teachings of this invention, thereby significantly reducing the weight of the heat exchanger 10. Unclad components are also more readily machined, thereby improving the tool life. Finally, the avoidance of requiring clad aluminum alloys is particularly advantageous for low-volume manufacturers in that such manufacturers are not compelled to make large quantity purchases.

Therefore, while our invention has been described in terms of a preferred embodiment, it is apparent that other forms could be adopted by one skilled in the art, such as by modifying the preferred quantity of the individual constituents of the flux-brazing composition 40; or by cladding the core aluminum alloy from which the headers, tubes and finned centers are formed; or by modifying the processing steps or heat exchanger design employed. Accordingly, the scope of our invention is to be limited only by the following claims.

The embodiments of the invention in which an exclusive property or privilege is claimed are defined as follows:

1. A method for assembling and brazing a heat exchanger having at least one tube extending from a header, said method comprising the steps of:
   forming the tube and header from aluminum alloys, wherein the header has at least one aperture corresponding in size to the tube and wherein the header and tube have corresponding surfaces which serve as joining surfaces therebetween;
   depositing a substantially nonaqueous flux-brazing composition on at least one of said joining surfaces in an amount sufficient to enhance brazeability and braze said joining surfaces during a brazing operation, said flux-brazing composition comprising a flux material, an aluminum-silicon powder, and hydroxypropyl cellulose as a binder;
   inserting the tue into said aperture in the header so as to mate said joining surfaces and form an assembly; and
   heating said assembly for a duration which is sufficient to melt the flux-brazing composition and thereby braze the tube to the header to form a monolithic heat exchanger;
   whereby said heating step is effective to form leak-proof brazed joints at said joining surfaces so as to produce a leak-proof aluminum heat exchanger.

2. A method as recited in claim 1 wherein said flux-brazing composition consists essentially of:
   from about 10 to about 50 weight percent of potassium tetrafluoroaluminate;
   from about 2 to about 13 weight percent silicon;
   from about 0.5 to about 3 weight percent of a metal selected from the group of metals whose electrode potential is less than the electrode potential of said aluminum alloy;
   from about 0.1 to about 2 weight percent of said binder; and
   the balance being aluminum;
   whereby said flux-brazing composition is substantially nonaqueous and has a paste-like consistency.

3. A method as recited in claim 1 wherein the particle size of said flux, said aluminum-silicon powder and said metal is each less than about 100 microns.

4. A method as recited in claim 1 wherein said heating step occurs at a temperature of about 1040° F. to about 1130° F.

5. A method as recited in claim 1 wherein said duration of said heating step is up to about 6 minutes.

6. A method as recited in claim 1 further comprising the steps of attaching a tank member to the header prior to said heating step so as to form a tank therewith.

7. A method as recited in claim 6 wherein said tank member is brazed to the header with said flux-brazing composition during said heating step.

8. A method as recited in claim 1 wherein said flux-brazing composition is deposited on said at least one joining surface while being suspended in a glycerin-ethylene glycol carrier system.

9. A method for assembling and brazing a heat exchanger suitable for use in an automotive air conditioning or cooling system, wherein the heat exchanger has a plurality of tubes extending between a pair of headers, said method comprising the steps of:

forming the headers and the tubes from an aluminum alloy material, each of the headers having a plurality of apertures corresponding in size and number to the plurality of tubes, each of the headers and tubes having corresponding surfaces which serve as pairs of joining surfaces therebetween;

depositing a substantially nonaqueous flux-brazing composition on at least one of each of said pairs of joining surfaces, said flux-brazing composition being deposited in an amount sufficient to enhance brazeability and braze said pairs of joining surfaces during a brazing operation, said flux-brazing composition consisting essentially of from about 10 to about 50 weight percent of potassium tetrafluoroaluminate flux, from about 2 to about 13 weight percent silicon, from about 0.5 to about 3 weight percent of a metal selected from the group of zinc, copper, indium and tin, and from about 0.1 to about 2 weight percent hydroxypropyl cellulose, with the balance being aluminum;

inserting each of the tubes into a corresponding one of said plurality of apertures in each of the headers so as to extend in hydraulic parallel between the headers, such that each of said joining surfaces of the headers are in intimate contact with a corresponding joining surface of the tubes, the headers and tubes forming an assembly; and brazing the plurality of tubes within said apertures of the headers by heating said assembly for a duration which is sufficient to melt the flux-brazing composition and thereby braze the tubes to the headers to form a monolithic heat exchanger;

whereby said brazing step is effective to form leak-proof brazed joints at said joining surfaces so as to produce a leak-proof aluminum heat exchanger.

10. A method as recited in claim 9 wherein said flux-brazing composition is deposited on said at least one joining surface while being suspended in a glycerin-ethylene glycol carrier system.

11. A method as recited in claim 10 further comprising the step of drying said flux-brazing composition at a temperature of no more than about 900° F. after said depositing step.

12. A method as recited in claim 9 wherein the particle size of said flux, said aluminum, said silicon and said metal is each less than about 100 microns.

13. A method as recited in claim 9 wherein said brazing step occurs at a temperature of about 1040° F. to about 1130° F.

14. A method as recited in claim 9 wherein said duration of said brazing step is up to about 6 minutes.

15. A method as recited in claim 9 further comprising the steps, prior to said brazing step, of:

depositing said flux-brazing composition along the length of at least one of the tubes; and inserting a finned member adjacent said at least one tube such that said finned member is brazed to said at least one tube during said brazing step.

16. A method as recited in claim 9 further comprising the steps of brazing a tank member to each of the headers with said flux-brazing composition during said brazing step so as to form a tank therewith.

17. A method as recited in claim 9 wherein said step of depositing said flux-brazing composition on said at least one joining surface comprises a spraying, dipping, rolling or flow coating operation.

18. A method as recited in claim 9 wherein said step of brazing occurs in a nitrogen atmosphere.

19. A method as recited in claim 9 wherein said step of depositing comprises coating the external surfaces of the tubes with said flux-brazing composition.

* * * * *